US007002099B2

(12) United States Patent
Watanabe

(10) Patent No.: US 7,002,099 B2
(45) Date of Patent: Feb. 21, 2006

(54) LASER BEAM MACHINE AND LASER BEAM MACHINING METHOD

(75) Inventor: Hiroko Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/473,179

(22) PCT Filed: Mar. 20, 2002

(86) PCT No.: PCT/JP02/02688

§ 371 (c)(1),
(2), (4) Date: Sep. 29, 2003

(87) PCT Pub. No.: WO02/092275

PCT Pub. Date: Nov. 21, 2003

(65) Prior Publication Data

US 2004/0112876 A1    Jun. 17, 2004

(30) Foreign Application Priority Data

May 14, 2001   (JP)   ............................. 2001-143063

(51) Int. Cl.
*B23K 26/08* (2006.01)
(52) U.S. Cl. .................... 219/121.67; 219/121.78
(58) Field of Classification Search .......... 219/121.67, 219/121.78; 700/166
See application file for complete search history.

(56) References Cited

U.S. PATENT DOCUMENTS

| | | | | |
|---|---|---|---|---|
| 5,089,683 A | * | 2/1992 | Stephenson et al. ... | 219/121.78 |
| 5,237,151 A | * | 8/1993 | Maruyama ............. | 219/121.78 |
| 5,406,048 A | * | 4/1995 | Yamazaki et al. ..... | 219/121.78 |

FOREIGN PATENT DOCUMENTS

| | | | |
|---|---|---|---|
| EP | 559916 A1 | | 9/1993 |
| FR | 2415513 A | * | 9/1979 |
| JP | 3-294079 A | * | 12/1991 |
| JP | 05-154681 | | 6/1993 |
| JP | 5-154681 A | | 6/1993 |
| JP | 06-182575 | | 7/1994 |
| JP | 6-182575 A | | 7/1994 |
| JP | 2000-233291 A | | 8/2000 |

* cited by examiner

*Primary Examiner*—Geoffrey S. Evans
(74) *Attorney, Agent, or Firm*—Sughrue Mion, PLLC

(57) ABSTRACT

A laser machining machine having a laser oscillator and a machining head communicating with each other through a propagation path for controlling the length of the propagation path in response to the position of the machining head. The laser machining machine divides a machining area at given intervals, and then sets an optical path position responsive to the machining area. The machine further detects the position of the machining head and controls the optical path length in response to the set optical path position.

7 Claims, 9 Drawing Sheets

CRT SCREEN

MAXIMUM OPTICAL PATH (mm): 4000.0

NUMBER OF MACHINING AREA DIVISIONS: 10

<OPTICAL PATH ADJUSTMENT BLOCK POSITION>

P1  100.0
P2  300.0
P3  500.0
⋮
P10 1900.0

P1–P10: OPTICAL PATH LENGTH ADJUSTMENT BLOCK POSITION FOR EACH MACHINING AREA (DISTANCE FROM ORIGIN)

LASER BEAM MACHINE AND LASER BEAM MACHINING METHOD

TECHNICAL FIELD

This invention relates to a laser machining apparatus and a laser machining method concerning optical path length control.

BACKGROUND ART

In a laser machining machine for moving a machining head, the length of an optical propagation path for communicating a laser oscillator and light gathering means with each other varies depending on the move position of the machining head. Thus, to maintain the optical path length fitted for the divergence characteristic of laser, it is necessary to lengthen or shorten the optical path length of a laser beam at some part on the propagation path for always keeping the propagation path from the laser oscillator to the light gathering means in the optical length.

Hitherto, a laser machining machine having an optical path length control mechanism for moving a machining head as shown in FIG. 10 has been available. In FIG. 10, a laser beam 11 output from an oscillator 3 passes through a path of reflecting mirrors a1 to a7 and arrives at a machining head 2.

Here, as shown in FIG. 10, if the machining head 2 is at a position above the left end of a machining table 1, an optical path length adjustment block 6 is positioned at a lower end of an optical path length control section 7 and the length from the oscillator 3 to the machining head 2 at this time is adopted as the reference length.

A control unit 4A calculates so that the propagation path length becomes the reference length regardless of what position the machining head 2 moves to, and sends a command to an amplifier SAu for driving the optical path length adjustment block 6. Then, a motor SVu is driven and the optical path length adjustment block 6 moves for keeping the propagation path in the reference length.

For example, if the machining head 2 moves to a position shown in FIG. 11, the propagation path lengthens (X+Y). Since the laser beam 11 is turned back in the optical path length control section 7, the optical path length adjustment block 6 is moved upward by a half of (X+Y).

In doing so, the propagation path length becomes the reference length.

Since the laser machining machine having the optical path length control mechanism in the related art is configured as described above, the optical path length adjustment block always moves in synchronization with the position of the machining head, whereby the propagation path length is controlled so as to become the reference length.

Thus, whenever the machining head moves, the optical path length adjustment block needs to move, and the belt for driving the optical path length adjustment block, the guide for supporting the optical path length adjustment block, and the like are worn heavily.

Particularly, to perform fine line segment machining like laser machining, acceleration and deceleration are frequently performed and thus the belt, the guide, and the like are worn still more rapidly.

Since it is necessary to always move the optical path length adjustment block, power is also consumed.

To synchronize with a move of the machining head, acceleration and deceleration at the moving time of the optical path length adjustment block need also be set to high values as acceleration and deceleration of the machining head and if acceleration and deceleration are set high, vibration is easily induced and thus rigidity of the optical path length mechanism needs to be enhanced.

DISCLOSURE OF INVENTION

The invention is intended for solving the problems and it is an object of the invention to provide an inexpensive laser machining machine having an optical path length control mechanism for lightening drive load on an optical path length control section.

To accomplish the object, according to a first aspect of the invention, there is provided a laser machining machine having a laser oscillator and a machining head communicating with each other through a propagation path for controlling the length of the propagation path in response to the position of the machining head, the laser machining machine including machining area setting means for dividing a machining area at given intervals; optical path position setting means for setting an optical path position responsive to the machining area; and optical path length control means for detecting the position of the machining head and controlling the optical path length in response to the optical path position set in the optical path position setting means.

To divide the machining area at given intervals in the machining area setting means, the number of machining area divisions is determined based on a preset value for each laser machining condition.

When sheet metal cutting is performed, the tolerance of the propagation path from the oscillator to the machining head is set to about 400 mm.

Further, the current machining area of the machining head is found by dividing the sum of the X and Y coordinates of the machining head by the distance of the machining area and the machining area in which the machining head is positioned at present, found by the calculation is compared with the preceding area, thereby controlling the optical path length control means.

The laser machining machine includes dead band width setting means for setting a section in which the optical path is not moved, wherein when the machining head is positioned in the dead band width, control of the optical path length based on the optical path length control means is not performed.

According to a second aspect of the invention, there is provided, in a laser machining machine having a laser oscillator and a machining head communicating with each other through a propagation path for controlling the length of the propagation path in response to the position of the machining-head, a laser machining method including the steps of detecting the current position of the machining head; determining whether or not the current position of the machining head is a move in a preset machining area; and if the current position of the machining head is not a move in the predetermined machining area as the result of the determination, controlling the optical path length to adjust the propagation path and if the current position of the machining head is a move in the predetermined area, suppressing controlling of the optical path length.

According to a third aspect of the invention, there is provided, in a laser machining machine having a laser oscillator and a machining head communicating with each other through a propagation path for controlling the length of the propagation path in response to the position of the machining head, a laser machining method including the steps of detecting the current position of the machining head; determining whether or not the current position of the machining head is a move in a preset machining area; and if the current position of the machining head is not a move in the predetermined machining area as the result of the determination, determining whether or not the move range is within a dead band width and only when the move is other than the dead band width, controlling the optical path length to adjust the propagation path.

BEST MODE FOR CARRYING OUT THE INVENTION

First Embodiment

Figure 1:
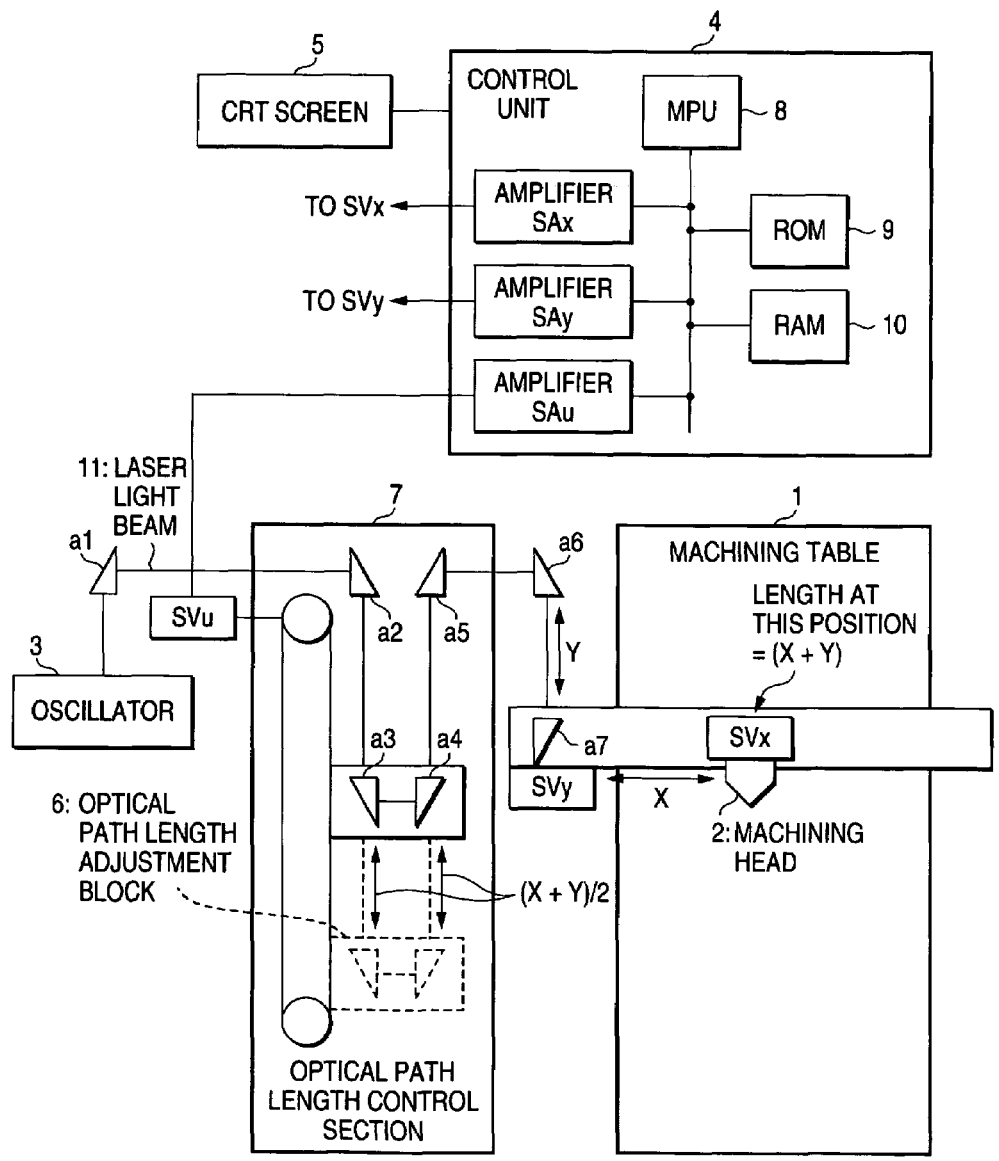
FIG. 1 is a system block diagram to show the configuration according to the invention.

FIG. 1 is a block diagram according to the first invention. In the figure, numeral 1 denotes a machining table, numeral 2 denotes a machining head for applying a laser beam 11 from an oscillator 3 to a workpiece placed on the machining table 1, numeral 3 denotes an oscillator for generating the laser beam 11, numeral 4 denotes a control unit for controlling a laser machining machine, numeral 5 denotes a CRT screen for setting parameters, etc., numeral 6 denotes an optical path length adjustment block for adjusting a propagation path as the optical path length adjustment block moves in synchronization with the position of the machining head 2, and numeral 7 denotes an optical path length control section for controlling the optical path length adjustment block 6 based on a servomotor SVu.

The control unit 4 includes a microprocessor (MPU) 8 and ROM 9 storing a control program, etc., of the MPU 8 as control means, nonvolatile RAM 10 for storing NC data, etc., as a machining program and storing various parameters, etc., servo amplifiers SAx and SAy as axis controllers for controlling drive of axis servomotors SVx and SVy for driving the machining head 2, and a servo amplifier SAu for controlling drive of a servomotor SVu for driving the optical path length adjustment block 6.

Figure 2:
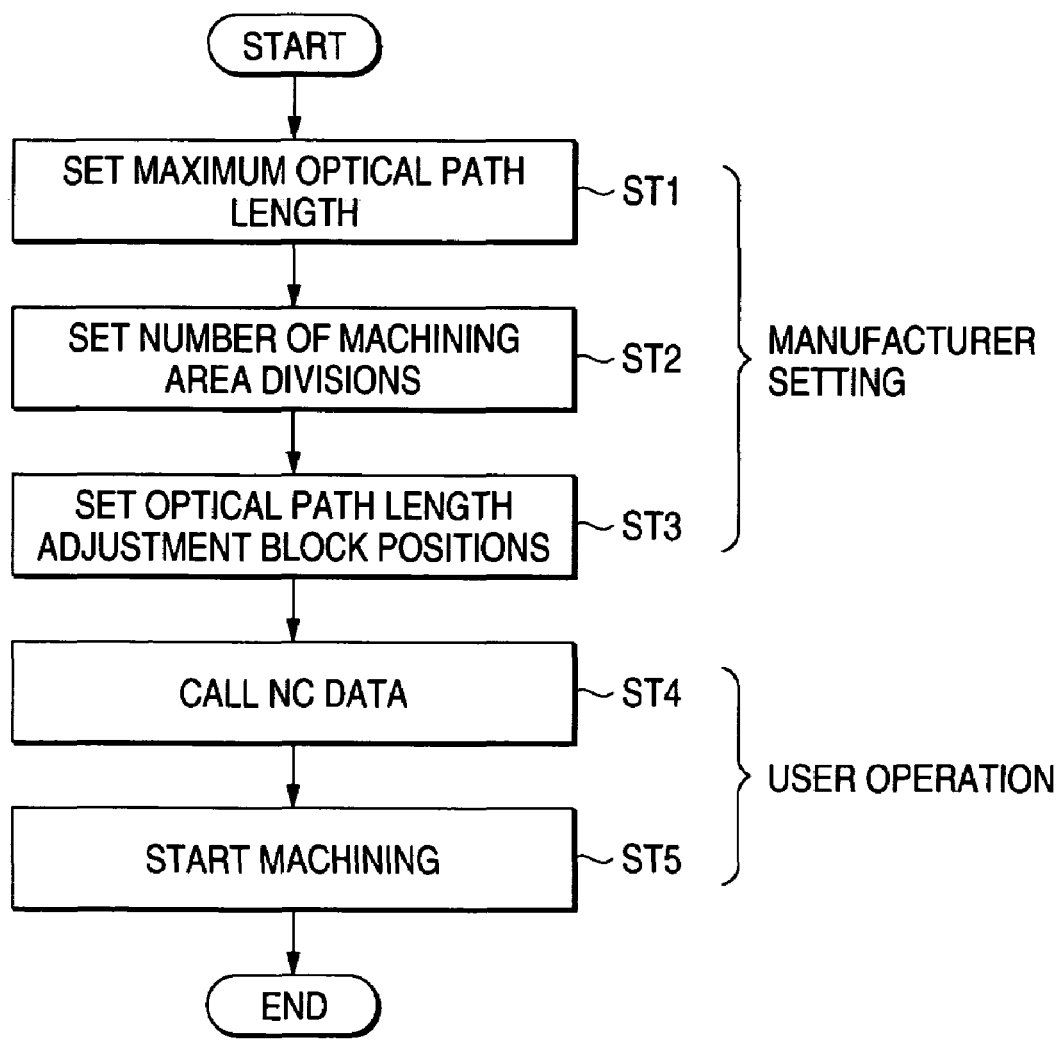
FIG. 2 is a manipulation chart according to a first embodiment.
Figure 3:
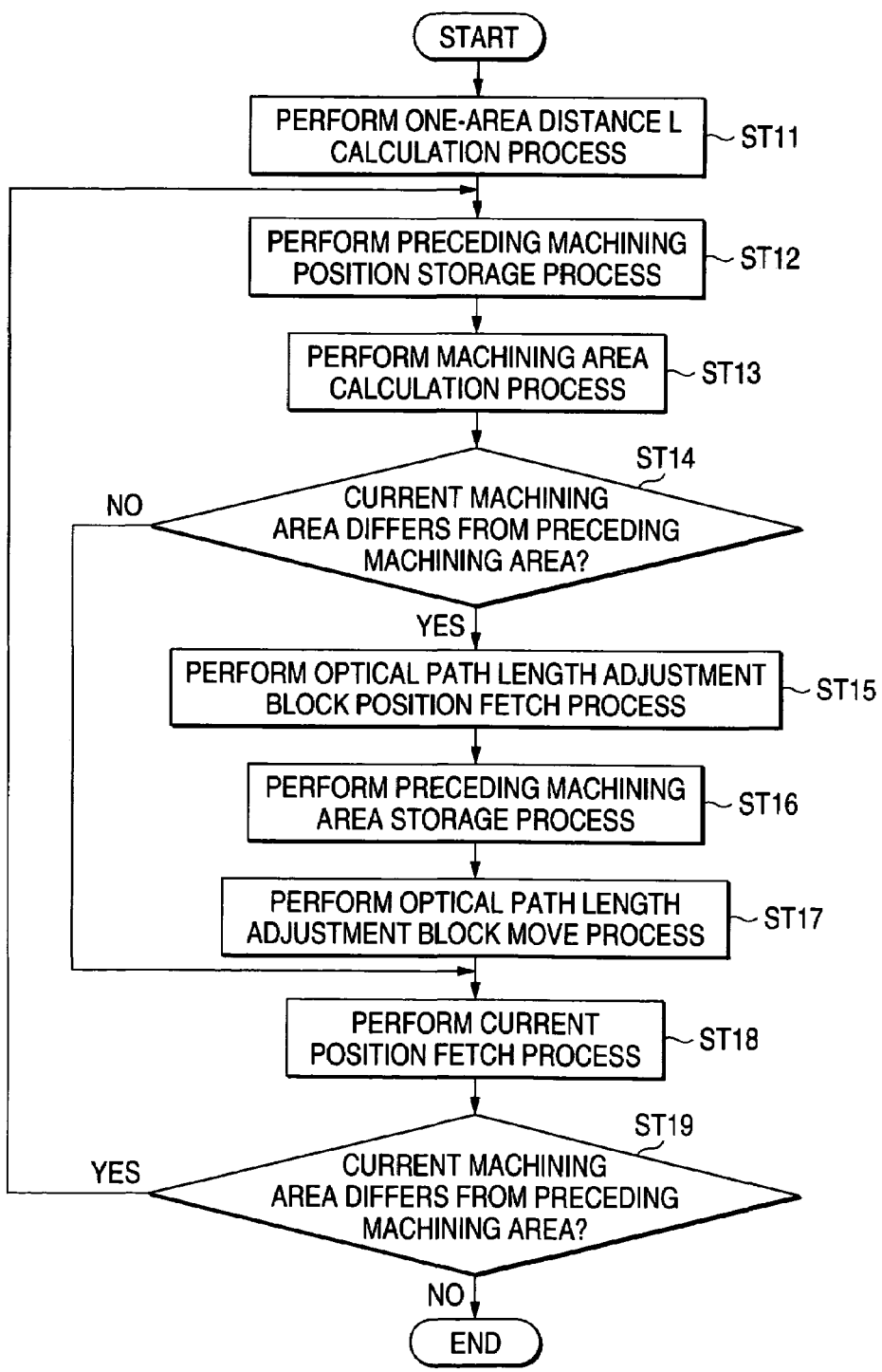
FIG. 3 is an operation chart according to the first embodiment.
Figures 4, 5:
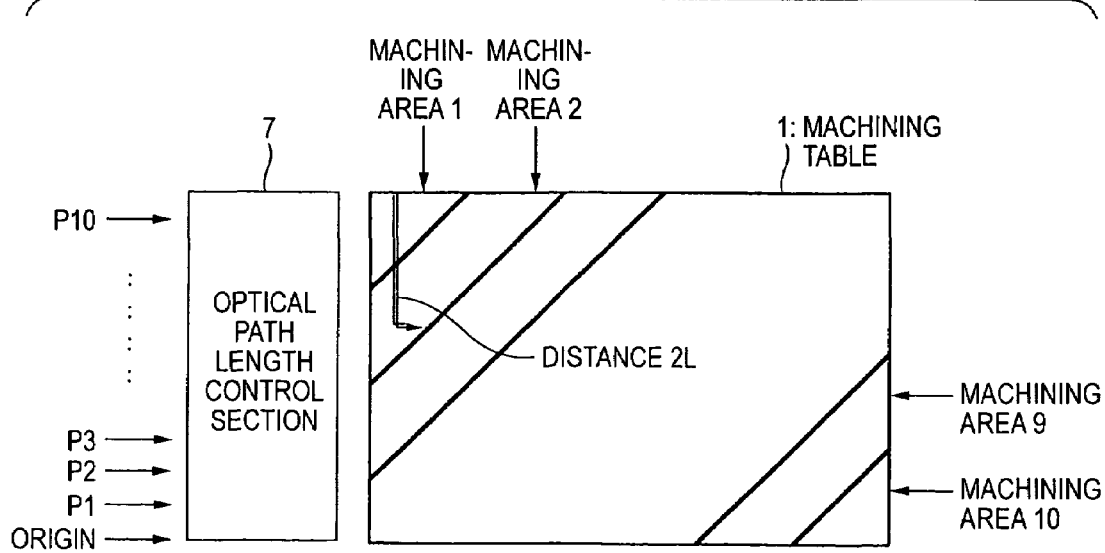
FIG. 4 is a setting screen example according to the first embodiment.
FIG. 5 is a machining area drawing according to the first embodiment.

FIG. 2 is a manipulation chart according to the first invention, FIG. 3 is an operation chart according to the first invention, FIG. 4 is a setting screen example according to the first invention, and FIG. 5 is a machining area drawing according to the first invention.

According to the embodiment, a machining area is previously divided as shown in FIG. 5 and while the machining head 2 is in the area, the optical path length adjustment block 6 does not move and only when the machining head 2 moves to another area, the optical path length adjustment block 6 is moved.

Next, the configuration, setting, and operation of the embodiment will be discussed in detail.

In the laser machining machine of the embodiment, using a keyboard (not shown) of the control unit 4, the position on the machining table where the machining head 2 is most distant from a reflecting mirror a6 (the maximum value of X+Y) is preset in a "MAXIMUM OPTICAL PATH LENGTH" field of a setting part of the CRT screen 5 shown in FIG. 4. (Set maximum optical path length at ST1.)

Next, using the keyboard of the control unit 4, the number of machining table area divisions is preset in a "NUMBER OF MACHINING AREA DIVISIONS" field of the setting part of the CRT screen 5. (Set number of machining area divisions at ST2.)

As described in the related art, the distance from the oscillator 3 to the machining head 2 is always set to a constant length, so that the convergence state of the laser beam 11 can be made constant.

In laser machining of sheet metal cutting, etc., however, if the distance from the oscillator 3 to the machining head 2 shifts about 400 mm, the minimum spot diameter (convergence beam diameter) differs about 0.5 mm and in general laser machining, it is known by experience that the difference of about 0.5 mm does not affect machining.

Therefore, the number of machining area divisions is set so that one machining area becomes about 400 mm or less. For example, if "MAXIMUM OPTICAL PATH LENGTH" is 3750 mm, 3750/400=9.375 and the number of divisions is set to 10. Although it has been described that a propagation path error of about 400 mm does not cause a problem in laser machining of sheet metal cutting, etc., the conditions vary from one laser machining to another.

Next, using the keyboard of the control unit 4, the coordinate position of the optical path length adjustment block 6 is set in an "OPTICAL PATH ADJUSTMENT BLOCK POSITION" field of the setting part of the CRT screen 5 so that the distance from the oscillator 3 to the center position of each machining area becomes a constant length. (Set optical path adjustment block positions at ST3.)

As shown in FIG. 5, assuming that one machining area distance is L, the distance to the center of machining area 1 becomes L/2.

Since the laser beam 11 is turned back in the optical path length control section 7, as the origin of the optical path length control section 7 is the lower end, the position of a half of L/2 from that position (L/4) becomes optical path adjustment block coordinate position P1 in machining area 1.

For machining area 2, the distance to the center of machining area 2 becomes L+L/2=3L/2 and thus optical path adjustment block coordinate position P2 in machining area 2 becomes 3L/4. For other machining areas, optical path adjustment block coordinate positions are set in a similar manner.

The input values are stored in the RAM 10 by the MPU 8. The manufacturer presets the values in the laser machining machine, whereby the machining areas are preset and when the machining head 2 operates across the machining areas, the optical path length adjustment block 6 operates, thereby implementing the laser machining machine for performing optical path length control.

The operator using the laser machining machine according to the embodiment uses the keyboard of the control unit 4 to call NC data for machining (call NC data at ST4) and presses a machining start key on the keyboard (start machining at ST5).

FIG. 3 is an operation chart after the machining start key is pressed.

When the machining start key is pressed, the MPU 8 performs the following operation according to the control program stored in the ROM 9:

To begin with, from the "maximum optical path length" and "number of machining area divisions" stored in the RAM 10, distance L of one area of the machining table (=maximum optical path length/number of machining area divisions) is calculated (one-area distance L calculation process at ST11).

Since one area becomes the distance L, machining area 1 becomes an area to L from the reflecting mirror a6 and machining area 2 becomes an area larger than the L distance and less than 2*L distance from the reflecting mirror a6 (see FIG. 5).

The current machining coordinate values (X, Y) are stored in the RAM 10 as the preceding machining position (preceding machining position storage process at ST12).

Next, which machining area the current machining head position corresponds to is calculated (machining area calculation process at ST13).

The following calculation expression is used:

Current machining area=(current $X$ coordinate value of machining head+current $Y$ coordinate value of machining head)/one-area distance $L$ Whether or not the calculated current machining area differs from the preceding area is determined (ST14). If the calculated current machining area is the same as the preceding machining area, control goes to current position fetch process ST18.

On the other hand, if the current machining area differs from the preceding machining area, the coordinate values of the optical path adjustment block corresponding to the current machining area are fetched from among the "optical path adjustment block positions" stored in the RAM 10 (optical path adjustment block position fetch process at ST15) and a command is output to the servomotor SVu for moving the optical path adjustment block 6 to the coordinate position.

Here, when a move of the optical path adjustment block 6 accompanying change of the machining area occurs, the optical path adjustment block coordinate position is set with the center of the machining area as the reference and thus the optical path length itself from the oscillator 3 to the machining head 2 is changed at a maximum of 200 mm and therefore within the range of shift of about 400 mm set above and the optical path adjustment block 6 need not be directly moved in synchronization with the machining head and a small time difference to follow is allowed.

Thus, as the servomotor SVu itself, a smaller-sized and smaller-capacity servomotor than a former servomotor can be used.

When power of the control unit 4 is turned on, the preceding machining area is set to 0.

Since the machining area starts at 1, it is determined at the first time when the power is turned on that the machining area differs from the preceding machining area, and the optical path adjustment block position fetch process is executed at ST15.

Next, the current machining area number is stored in the RAM 10 as the preceding machining area (preceding machining area storage process at ST16).

Next, a command is sent to the servo amplifier SAu so as to move to the coordinate values fetched in the optical path length adjustment block position fetch process at ST15, whereby the motor SVu is driven for moving the optical path length adjustment block 6 (optical path length adjustment block move process at ST17). After this, while the machining head 2 moves, the above-described processing is repeated.

To determine whether or not the machining head 2 is moving, feedback position data (which indicates the current machining head position) is fetched from the servo amplifiers SAx and SAy (current position fetch process at ST18) and whether or not the current machining position differs from the preceding machining position is determined.

If they differ, the process goes to ST12.

According to the embodiment, when machining of the laser machining machine is performed, the above-described processing is performed, so that only when the machining area differs from the preceding machining area, the optical path length adjustment block 6 is moved to the predetermined position in response to the machining area.

Thus, the optical path adjustment block is moved in the divided machining area units, so that the machining machine with the guide for supporting the optical path adjustment block, the belt of the drive portion, and the like being less worn and consuming small power can be constructed.

When the machining head is moved, the optical path length adjustment block 6 is moved independently of beam application.

Second Embodiment

Next, the configuration and operation of a second embodiment will be discussed.

Figure 6:
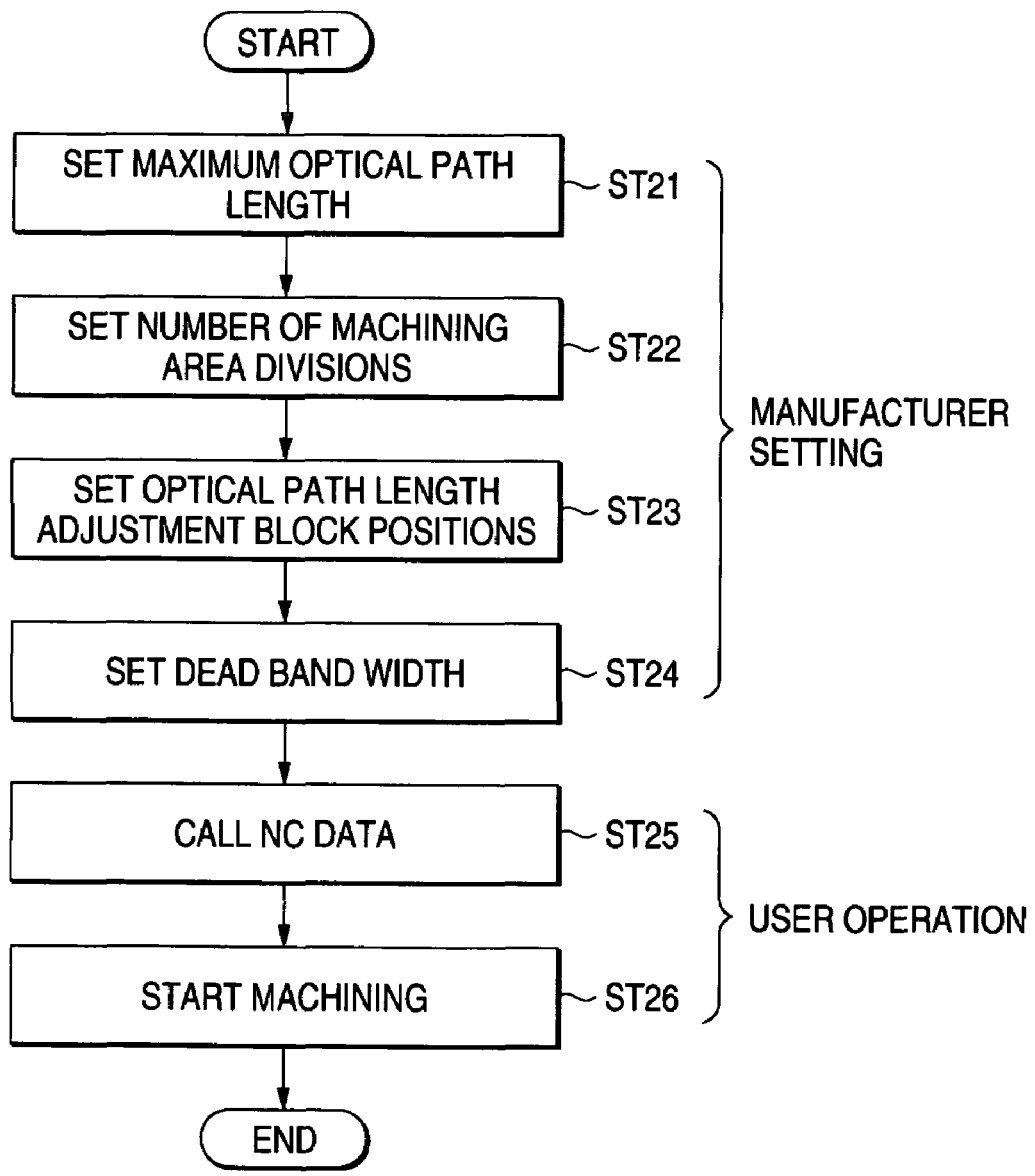
FIG. 6 is a manipulation chart according to a second embodiment.
Figure 7:
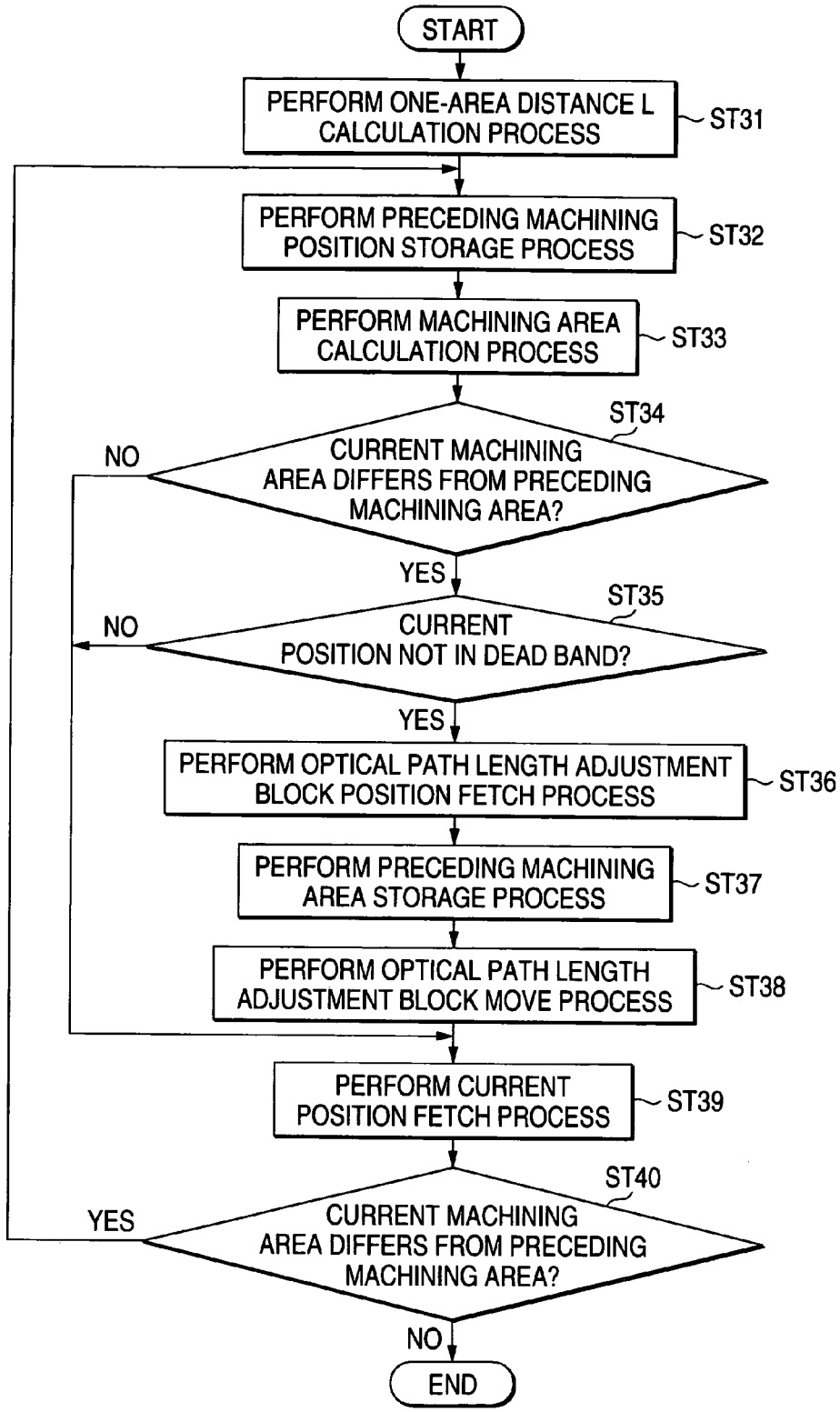
FIG. 7 is an operation chart according to the second embodiment.

The configuration of a laser machining machine according to the second embodiment is the same as that in FIG. 1. FIG. 6 is a manipulation chart according to the embodiment, FIG. 7 is an operation chart, FIG. 8 is a setting screen, and FIG. 9 is a machining area drawing.

Figures 8, 9:
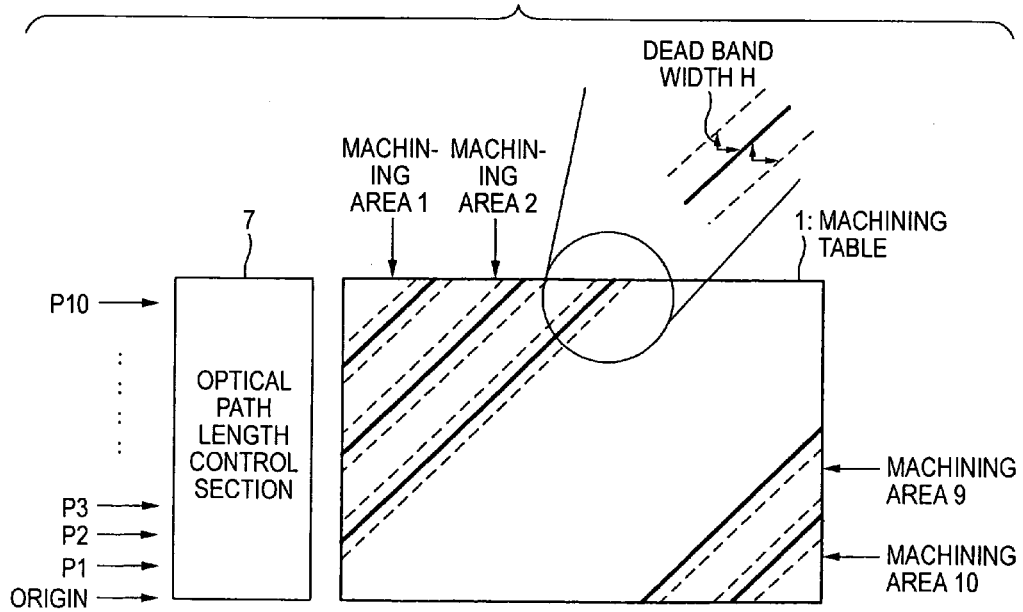
FIG. 8 is a setting screen example according to the second embodiment.
FIG. 9 is a machining area drawing according to the second embodiment.
Figure 10:
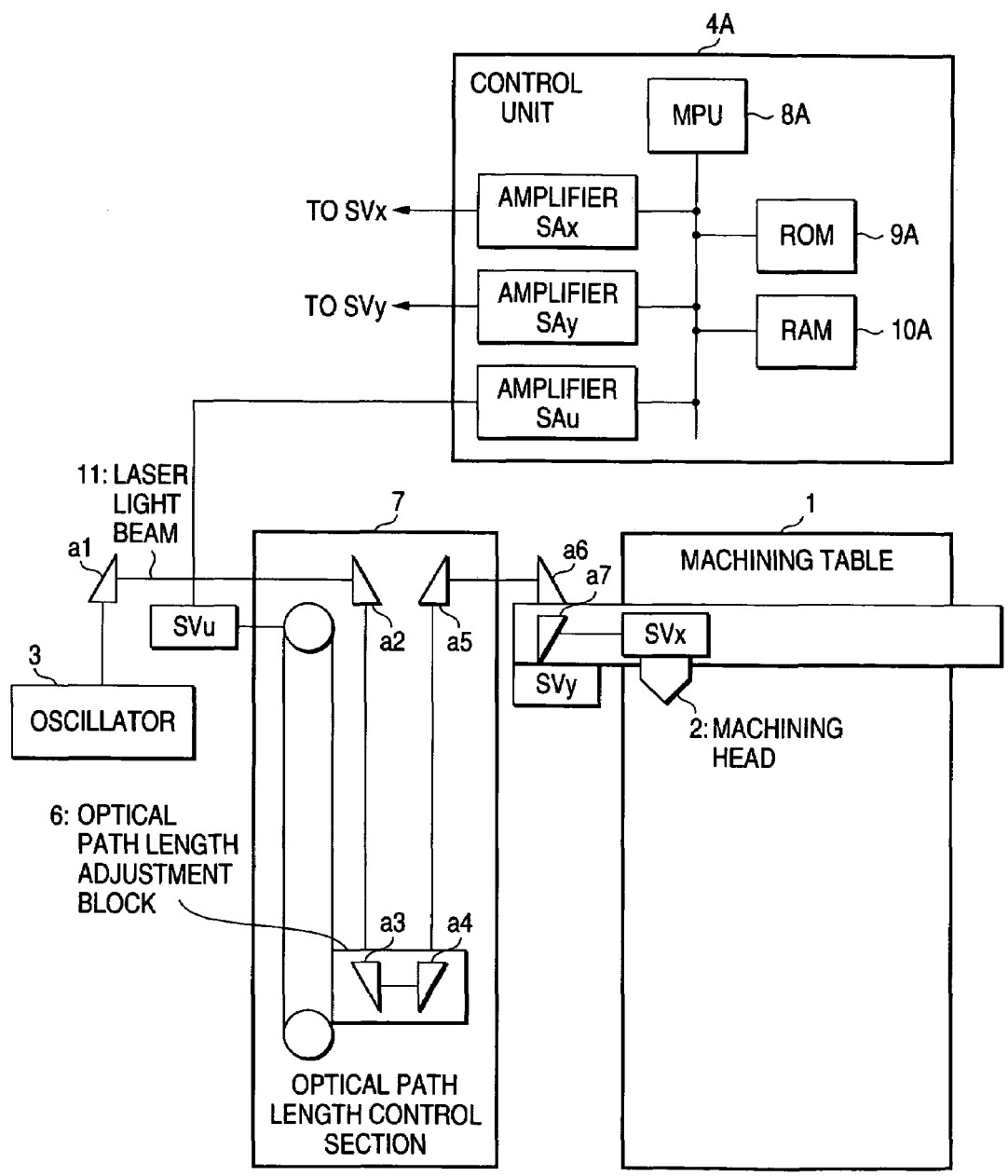
FIG. 10 is a system block diagram to show the configuration in a related art.
Figure 11:
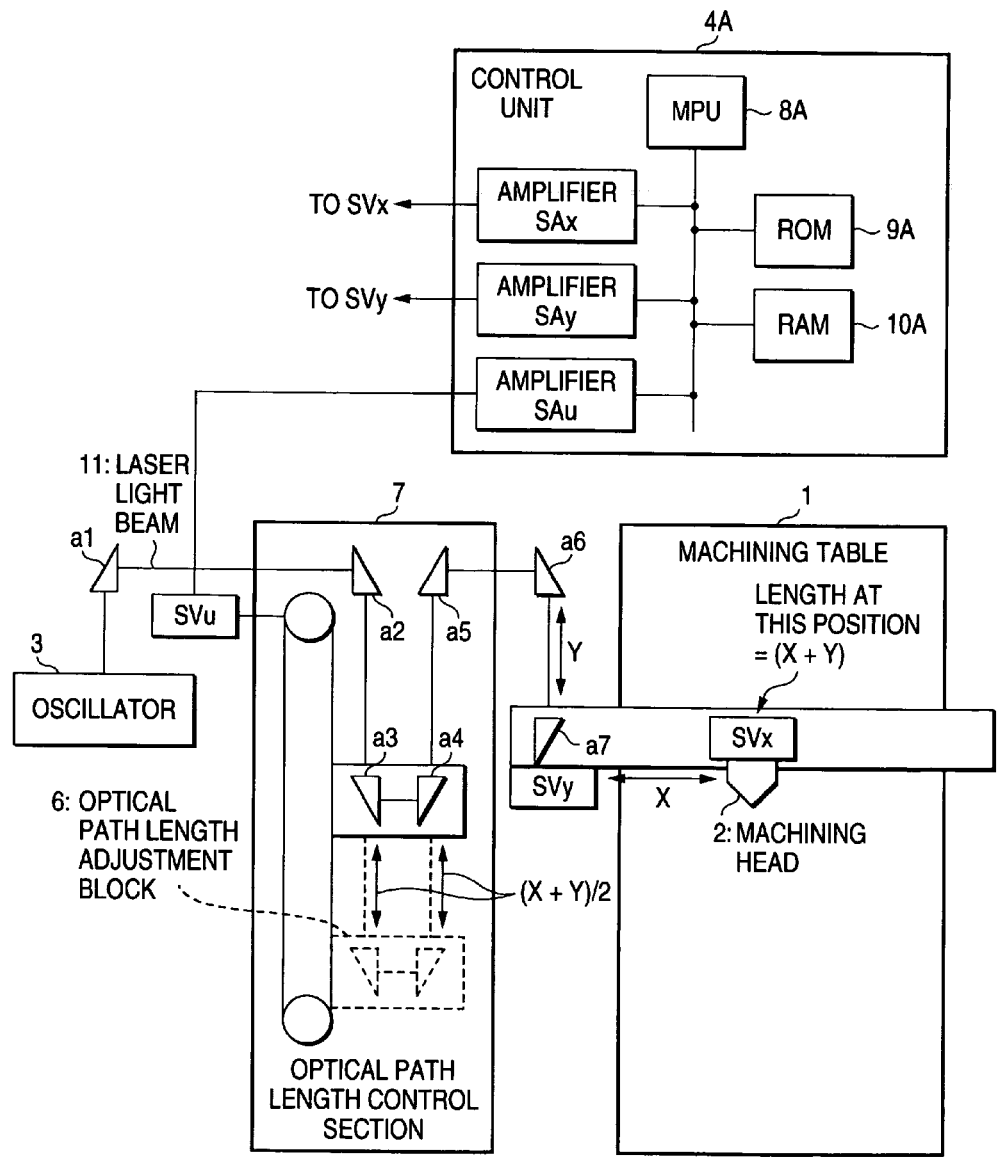
FIG. 11 is a system block diagram to show the configuration in the related art.

According to the embodiment, as shown in FIG. 9, a machining area is previously divided as in the first embodiment, a dead band is set between the machining areas, and while a machining head 2 is in the dead band, an optical path length adjustment block 6 does not move and only when the machining head 2 moves from the dead band, the optical path adjustment block 6 is moved.

Next, the configuration, setting, and operation of the embodiment will be discussed in detail.

In the laser machining machine of the embodiment, using a keyboard (not shown) of a control unit 4, the position on a machining table where the machining head 2 is most distant from a reflecting mirror a6 (the maximum value of X+Y) is preset in a "MAXIMUM OPTICAL PATH LENGTH" field of a setting part of a CRT screen 5 shown in FIG. 8. (Set maximum optical path length at ST21.)

Next, using the keyboard of the control unit 4, the number of machining table area divisions is preset in a "NUMBER OF MACHINING AREA DIVISIONS" field of the setting part of the CRT screen 5. (Set number of machining area divisions at ST22.)

As described in the related art, the distance from the oscillator 3 to the machining head 2 is always set to a constant length, so that the convergence state of the laser beam 11 can be made constant.

In laser machining of sheet metal cutting, etc., however, if the distance from the oscillator 3 to the machining head 2 shifts about 400 mm, the minimum spot diameter (convergence beam diameter) differs about 0.5 mm and in general laser machining, it is known by experience that the difference of about 0.5 mm does not affect machining.

Therefore, the number of machining area divisions is set so that one machining area becomes about 400 mm or less. For example, if "MAXIMUM OPTICAL PATH LENGTH" is 3750 mm, 3750/400=9.375 and the number of divisions is set to 10. Although it has been described that a propagation path error of about 400 mm does not cause a problem in laser machining of sheet metal cutting, etc., the conditions vary from one laser machining to another.

Next, using the keyboard of the control unit 4, the coordinate position of the optical path length adjustment block 6 is set in an "OPTICAL PATH ADJUSTMENT BLOCK POSITION" field of the setting part of the CRT screen 5 so that the distance from the oscillator 3 to the center position of each machining area becomes a constant length. (Set optical path adjustment block positions at ST23.)

As shown in FIG. 9, assuming that one machining area distance is L, the distance to the center of machining area 1 becomes L/2.

Since the laser beam 11 is turned back in an optical path length control section 7, as the origin of the optical path length control section 7 is the lower end, the position of a half of L/2 from that position (L/4) becomes optical path adjustment block coordinate position P1 in machining area 1.

For machining area 2, the distance to the center of machining area 2 becomes 2L/2=L and thus optical path adjustment block coordinate position P2 in machining area 2 becomes L/2. For other machining areas, optical path adjustment block coordinate positions are set in a similar manner.

Next, using the keyboard of the control unit 4, the dead band value is set in a "DEAD BAND WIDTH" field of the setting part of the CRT screen 5 (set dead band width at ST24).

If the machining head 2 moves on the boundary between the divided machining areas, the machining head reciprocates between the machining areas and the optical path length adjustment block 6 also moves accordingly.

If the optical path length adjustment block 6 frequently moves, vibration is easily induced.

In a method of increasing the number of divisions, the number of times the optical path length adjustment block 6 moves when the machining head 2 moves on the boundary between the machining areas is not decreased.

Thus, to prevent the optical path length adjustment block 6 from frequently moving, dead band width H is provided and set. The dead band width H is about 10 mm by experience considering a general laser machining shape to such an extent that it does not affect the minimum spot diameter.

The input values are stored in the RAM 10.

The manufacturer presets the values in the laser machining machine, whereby the machining areas and the dead band width are preset and when the machining head 2 operates across the machining areas, the optical path length adjustment block 6 operates, thereby implementing the laser machining machine for performing optical path length control.

The operator using the laser machining machine according to the embodiment uses the keyboard of the control unit 4 to call NC data for machining (call NC data at ST25) and presses a machining start key on the keyboard (start machining at ST26).

FIG. 7 is an operation chart after the machining start key is pressed.

When the machining start key is pressed, an MPU 8 performs the following operation according to the control program stored in the ROM 9:

To begin with, from the "maximum optical path length" and "number of machining area divisions" stored in the RAM 10, distance L of one area of the machining table (=maximum optical path length/number of machining area divisions) is calculated (one-area distance L calculation process at ST31).

Since one area becomes the distance L, machining area 1 becomes an area to L from the reflecting mirror a6 and machining area 2 becomes an area larger than the L distance and less than 2*L distance from the reflecting mirror a6 (see FIG. 5).

The current machining coordinate values (X, Y) are stored in the RAM 10 as the preceding machining position (preceding machining position storage process at ST32).

Next, which machining area the current machining head position corresponds to is calculated (machining area calculation process at ST33).

The following calculation expression is used:

Current machining area=(current $X$ coordinate value of machining head+current $Y$ coordinate value of machining head)/one-area distance $L$ Whether or not the calculated current machining area differs from the preceding area is determined (ST34).

When power of the control unit 4 is turned on, the preceding machining area is set to 0.

Since the machining area starts at 1, it is determined at the first time when the power is turned on that the machining area differs from the preceding machining area.

If the current machining area is the same as the preceding machining area, control goes to current position fetch process ST39.

The value set at dead band width setting ST105 becomes both sides of the boundary line between the machining areas as shown in FIG. 9.

If the current machining area differs from the preceding machining area, whether or not the current position is in the dead band is determined. (ST35).

For example, if the preceding machining area is 2 and the current machining area becomes 3 in the machining area calculation process at ST33, the following determination is made:

$L1$=current $X$ coordinate value of machining head+current $Y$ coordinate value of machining head $L2$=one-area-distance $L*2$+dead band width $H$ (the distance $L$ is doubled because the machining area is 2)

If $L1<L2$, it is determined that the machining head 2 is in the dead band of machining area 3.

If $L1>=L2$, it is determined that the machining head 2 is not in the dead band (ST35).

If the machining head 2 is in the dead band, control goes to current position fetch process ST39.

If the machining head 2 is not in the dead band, the coordinate values of the optical path adjustment block corresponding to the current machining area are fetched from among the "optical path adjustment block positions" stored in the RAM 10 (optical path adjustment block position fetch process at ST36).

Next, the current machining area number is stored in the RAM 10 as the preceding machining area (preceding machining area storage process at ST37).

Next, a command is sent to a servo amplifier SAu so as to move to the coordinate values fetched in the optical path length adjustment block position fetch process at ST36, whereby a motor SVu is driven for moving the optical path length adjustment block 6 (optical path length adjustment block move process at ST38).

After this, while the machining head 2 moves, the above-described processing is repeated.

To determine whether or not the machining head 2 is moving, feedback position data (which indicates the current machining head position) is fetched from servo amplifiers SAx and SAy (current position fetch process at ST39) and whether or not the current machining position differs from the preceding machining position is determined. If they differ, the process goes to ST32.

According to the embodiment, the above-described processing is performed at the machining time of the laser machining machine, so that only when the machining area differs from the preceding machining area and deviates to the dead band, the optical path length adjustment block 6 is moved to the predetermined position in response to the machining area. Thus, in addition to the advantage of the first embodiment, if the machining head 2 reciprocates between the machining areas, when the machining head 2 is in the dead band, the optical path length adjustment block 6 does not move, so that acceleration and deceleration of the optical path axis can be executed mildly and a machining machine not inducing vibration can be constructed.

Although the optical path length adjustment block is used, a beam optimization unit may be used.

As described above in detail, according to the invention, the optical path length adjustment block moves in the divided machining area units, so that the time until the belt for driving the optical path length adjustment block, the guide for supporting the optical path length adjustment block, etc., is worn out can be prolonged.

Since the optical path length adjustment block need not always be moved, power consumption can also be decreased.

Since the dead band width is provided, when machining is performed across the machining areas, the optical path length does not move between the machining areas each time, so that acceleration and deceleration of the optical path axis can be executed mildly and an inexpensive machining machine not inducing vibration can be constructed.

INDUSTRIAL APPLICABILITY

As described above, the laser machining apparatus and the laser machining method according to the invention are suited for use concerning optical path length control.

What is claimed is:

1. A laser machining machine having a laser oscillator and a machining head communicating with each other through a propagation path for controlling a length of the propagation path in response to a position of the machining head, said laser machining machine comprising;

machining area setting means for dividing a machining area at given intervals;

optical path position setting means for setting an optical path position responsive to the machining area; and optical path length control means for detecting a position of the machining head and controlling an optical path length in response to the optical path position set in said optical path position setting means.

2. The laser machining machine as claimed in claim 1, wherein to divide the machining area at given intervals in said machining area setting means, the number of machining area divisions is determined based on a preset value for each laser machining condition.

3. The laser machining machine as claimed in claim 2, wherein when sheet metal cutting is performed, a tolerance of the propagation path from the oscillator to the machining head is set to about 400 mm.

4. The laser machining machine as claimed in any of claims 1 to 3 wherein the current machining area of the machining head is found by dividing the sum of the X and Y coordinates of the machining head by the distance of the machining area and the machining area in which the machining head is positioned at present, found by the calculation is compared with the preceding area, thereby controlling said optical path length control means.

5. The laser machining machine as claimed in claim 1, further comprising dead band width setting means for setting a section in which the optical path is not moved, wherein when the machining head is positioned in the dead band width, control of the optical path length based on said optical path length control means is not performed.

6. In a laser machining machine having a laser oscillator and a machining head communicating with each other through a propagation path for controlling the length of the propagation path in response to the position of the machining head, a laser machining method comprising the steps of:

detecting a current position of the machining head;

determining whether or not the current position of the machining head is in a predetermined machining area; and if the current position of the machining head is not in the predetermined machining area as the result of the determination, controlling the optical path length to adjust the propagation path, and if the current position of the machining head is in the predetermined area, suppressing controlling of the optical path length.

7. In a laser machining machine having a laser oscillator and a machining head communication with each other through a propagation path for controlling the length of the propagation path in response to the position of the machining head, a laser machining method comprising the steps of:

detecting a current position of the machining head;

determining whether or not the current position of the machining head is in a predetermined machining area; and if the current position of the machining head is not in the predetermined machining area as the result of the determination, determining whether or not a move range is within a dead band width and only when the move is other than the dead band width, controlling the optical path length to adjust the propagation path.

* * * * *